(12) United States Patent
Sogo

(10) Patent No.: US 9,672,637 B2
(45) Date of Patent: Jun. 6, 2017

(54) INSTRUMENT FOR VEHICLE

(71) Applicant: HONDA MOTOR CO., LTD., Tokyo (JP)

(72) Inventor: Taichi Sogo, Utsunomiya (JP)

(73) Assignee: HONDA MOTOR CO., LTD., Tokyo (JP)

( * ) Notice: Subject to any disclaimer, the term of this patent is extended or adjusted under 35 U.S.C. 154(b) by 351 days.

(21) Appl. No.: 14/492,493

(22) Filed: Sep. 22, 2014

(65) Prior Publication Data

US 2015/0103089 A1 Apr. 16, 2015

(30) Foreign Application Priority Data

Oct. 11, 2013 (JP) .................................. 2013-214061

(51) Int. Cl.
| | |
|---|---|
| G06T 11/00 | (2006.01) |
| B60K 35/00 | (2006.01) |
| G06F 3/14 | (2006.01) |
| G09G 3/34 | (2006.01) |

(52) U.S. Cl.
CPC ............ *G06T 11/001* (2013.01); *B60K 35/00* (2013.01); *G06F 3/1423* (2013.01); *G09G 3/3406* (2013.01); *G09G 2320/0646* (2013.01); *G09G 2320/0653* (2013.01); *G09G 2380/10* (2013.01)

(58) Field of Classification Search
None
See application file for complete search history.

(56) References Cited

U.S. PATENT DOCUMENTS

| | | | |
|---|---|---|---|
| 2002/0135573 A1* | 9/2002 | Kanamori | B60K 35/00 345/204 |
| 2002/0140552 A1 | 10/2002 | Wada | |
| 2010/0102945 A1 | 4/2010 | Watson et al. | |

FOREIGN PATENT DOCUMENTS

| | | | |
|---|---|---|---|
| CN | 102132134 | 7/2011 | |
| DE | 10212168 | 10/2002 | |
| DE | 10212600 | 10/2002 | |
| DE | 10208826 | 9/2003 | |
| DE | 102009046010 | 7/2010 | |
| JP | 2000-111366 | 4/2000 | |
| JP | 2009-244033 | 10/2009 | |
| JP | 2009244033 | * 10/2009 | ............ B60K 35/00 |
| JP | 2011-093454 | 5/2011 | |

OTHER PUBLICATIONS

Chinese Office Action dated Aug. 2, 2016.
German Office Action with English Translation, dated Nov. 9, 2015, 25 pages.
Japanese Office action dated Jun. 2, 2015, English translation included.

* cited by examiner

*Primary Examiner* — Vu Nguyen
(74) *Attorney, Agent, or Firm* — Rankin, Hill & Clark LLP

(57) ABSTRACT

This instrument for the vehicle includes: a display unit; a light source; and a control unit, wherein in response to an input of an dramatized-display instruction signal, the control unit causes an dramatized display that is different from the predetermined display to be displayed in the first display region, causes the second display region to turn dark, and causes the light source to be lit with a predetermined brightness when the configured brightness is greater than the predetermined brightness.

10 Claims, 7 Drawing Sheets

INSTRUMENT FOR VEHICLE

CROSS-REFERENCE TO RELATED APPLICATION

Priority is claimed on Japanese Patent Application No. 2013-214061, filed on Oct. 11, 2013, and the content of which is incorporated herein by reference.

BACKGROUND OF THE INVENTION

Field of the Invention

The present invention relates to an instrument for a vehicle.

Description of Related Art

A conventionally known display device (for example, refer to Japanese Unexamined Patent Application, First Publication No. 2011-093454) displays items on the liquid crystal display device by transmitting the light from behind, when viewed from the occupant of the vehicle, of the liquid crystal display device.

SUMMARY OF THE INVENTION

In the display device according to the aforementioned conventional technology, it is problematic that the background of the liquid crystal display becomes visible due to its transparency, and there has been a need to solve this problem and prevent a deterioration in design.

In view of the aforementioned circumstances, the present invention has an object of providing an instrument for a vehicle that can retain an excellent design.

In order to solve the aforementioned problems and achieve the aforementioned object, the instrument for a vehicle according to the present invention employs the following.

(1) According to an aspect of the present invention, an instrument for a vehicle includes: a display unit that is transmissive type and has at least a first display region and a second display region; a light source that is configured to illuminate the display unit from behind of the display unit; and a control unit that causes a predetermined display to be displayed in the first display region, causes a predetermined display to be displayed in the second display region, and causes the light source to be lit with a configured brightness, wherein in response to an input of a dramatized-display instruction signal, the control unit causes a dramatized display that is different from the predetermined display to be displayed in the first display region, causes the second display region to turn dark (blank), and causes the light source to be lit with a predetermined brightness when the configured brightness is greater than the predetermined brightness.

(2) In the instrument for the vehicle described in aforementioned (1), when the configured brightness is smaller than the predetermined brightness, the control unit may cause the light source to be lit with the configured brightness in response to the input of the dramatized-display instruction signal.

(3) In the instrument for the vehicle described in aforementioned (1) or (2), the instrument for the vehicle may further include a second display unit that is located near the display unit and performs a predetermined indication according to a control from the control unit, the second display region may be located between the first display region and the second display unit, and in response to the input of the dramatized-display instruction signal, the control unit may cause the second display unit to perform a dramatized indication that is different from the predetermined indication.

(4) In the instrument for the vehicle described in aforementioned (1) to (3), the first display region and the second display region may be arranged in a right and left direction of the vehicle.

(5) In the instrument for the vehicle described in aforementioned (3), the second display unit may include a scale and an indicator needle that indicates a reading on the scale, in response to the input of the dramatized-display instruction signal, the control unit may cause the second display unit to perform a sweeping indication, in which the indicator needle repeats reciprocating movements between minimum and maximum values of the scale, the first display region may be capable of displaying a plurality of segments that are aligned in parallel with the outline of the second display unit, and capable of indicating minimum and maximum values by displaying one or more members of the plurality of segments, and in the dramatized display, the first display region may repeat reciprocally indicating between minimum and maximum values, and, the sweeping indication in the second display unit and the dramatized display in the first display region may be synchronized.

In the instrument for the vehicle according to an aspect described in aforementioned (1), when the instrument for the vehicle performs the dramatized display operation according to the input of the dramatized-display instruction signal, the brightness of the light source is at the predetermined brightness or lower. This prevents excessive difference in the brightness between the first display region displaying the dramatized display and the second display region that is turned dark (blank). Even when the background light leaks through the darkened (blanked) second display region, this aspect prevents this background light from being excessively notable.

Further, in the aspect described in aforementioned (2), the instrument for the vehicle can keep the configured brightness sufficiently high, and still the backlight leakage in the second display region does not stand out.

Further, in the aspect described in aforementioned (3), during the second display region caused to turn dark (blank), the dramatized display of the first display region and the dramatized indication of the second display unit presents a clearly notable impression.

Further, in the aspect described in aforementioned (4), as the first display region, the second display region, and the second display unit are arranged in a right and left direction of the vehicle, the dramatization operation can be presented over the wide range in the right and left direction of the vehicle.

Further, in the aspect described in aforementioned (5), the dramatized display on the first display region and the dramatized indication on the second display unit presents a uniformed impression.

DESCRIPTION OF EMBODIMENTS

Hereinbelow, an instrument for a vehicle according to an embodiment of the present invention will be described with reference to the attached drawings.

Figure 1:
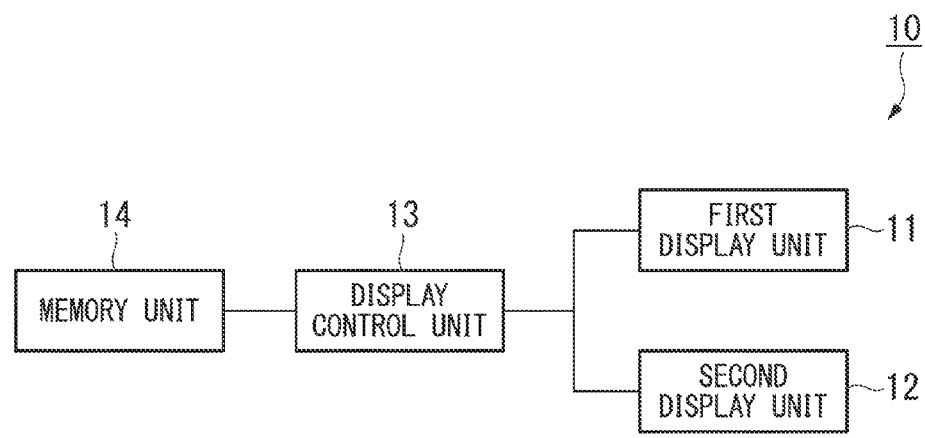
FIG. 1 is a configuration diagram of an instrument for a vehicle according to an embodiment of the present invention.

As shown in FIG. 1, the instrument for the vehicle 10 according to the present embodiment is mounted on a vehicle such as a hybrid vehicle. The instrument for the vehicle 10 includes a first display unit 11, a second display unit (second indication unit) 12, a display control unit 13, and a memory unit 14.

Figure 2:
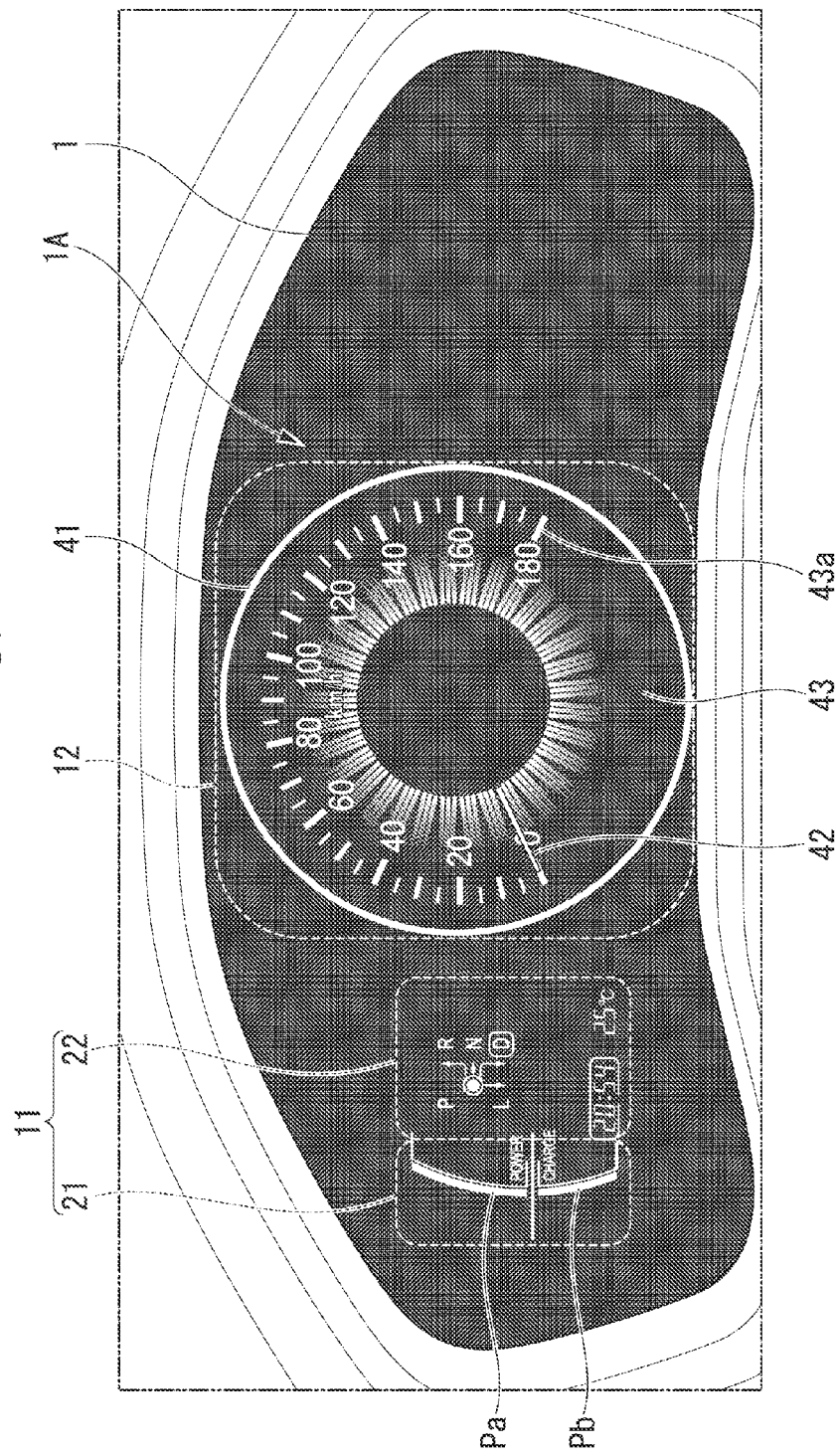
FIG. 2 is a diagram showing a first display unit and a second display unit of an instrument for a vehicle according to an embodiment of the present invention.

As shown in FIG. 2, the first display unit 11 and the second display unit 12 are provided at an instrument panel 1, are arranged in a right and left direction of the vehicle, and are disposed so as to be visible from the occupant seated on the driver's seat (not shown in the drawing) of the vehicle.

The first display unit 11 is a liquid crystal display device that is transmissive type. The first display unit 11 includes a plurality of display regions. The display regions are located further to the left of the center portion of the meter panel 1A, when viewed from the occupant seated on the driver's seat of the vehicle. The display regions may include, for example, the first display region 21 and the second display region 22. The first display region 21 may be a multiple-segment bar meter, which indicates the degrees of power running (powering) and regeneration of the vehicle traction motor by the number of the segments. The second display region 22 is disposed to the right of the first display region 21 when viewed from the occupant of the vehicle. The second display region 22 may display information such as the gear position, the time, and the temperature.

Figure 3:
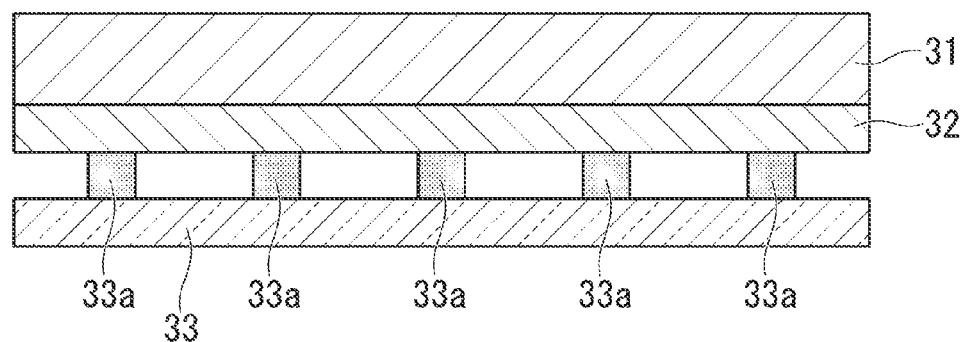
FIG. 3 is a sectional diagram showing a structure of a first display unit of an instrument for a vehicle according to an embodiment of the present invention.
Figure 4:
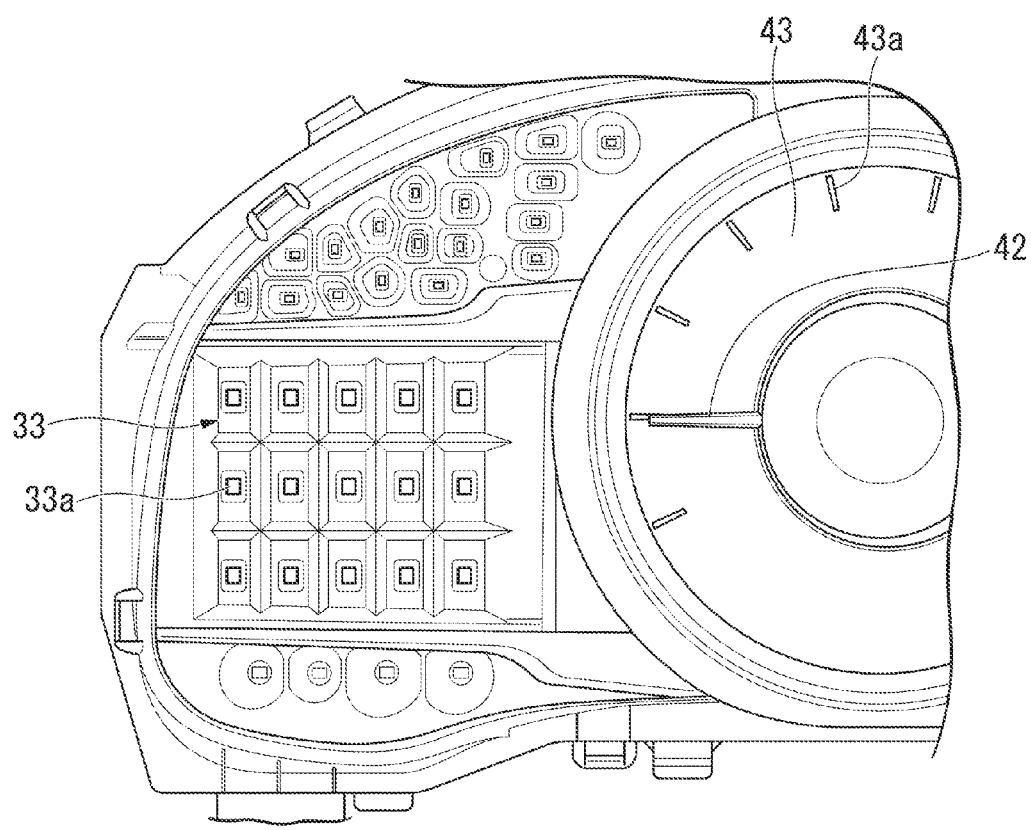
FIG. 4 is a sectional diagram showing a structure of a segment light source of a first display unit, and an indicator needle and an indicator unit of a second display unit of an instrument for a vehicle according to an embodiment of the present invention.

As shown in FIG. 3, the first display unit 11 includes a liquid crystal display instrument 31, a light guiding unit 32, and a segment light source 33, which are sequentially arranged from a position closer to the occupant of the vehicle, to a position away from the occupant. The light guiding unit 32 may include a light diffusion plate or the like. As shown in FIG. 4, the segment light source 33 includes a plurality of the light sources 33a that are divided into a grid pattern. The segment light source 33 illuminates the liquid crystal display instrument 31 from behind the liquid crystal display instrument 31 as viewed from the occupant of the vehicle.

The second display unit 12 may be, for example, a mechanical speedometer that shows an indication according to the speed of the vehicle. The second display unit 12 is provided at the center portion of the meter panel 1A. The second display unit 12 includes a display plate 41, an indicator needle 42, an indicator unit 43, and an actuator (not shown in the drawing), which are sequentially arranged from a position closer to the occupant of the vehicle, to a position away from the occupant. The display plate 41 includes a scale and characters that are illuminated from behind as viewed from the occupant of the vehicle. The indicator needle 42 is driven to rotate by the actuator, and is illuminated by a light source (not shown) such as light-emitting diodes, through a light guide or the like (not shown). The indicator unit 43 includes such as a scale 43a that is pointed by the indicator needle 42. The indicator unit 43 is illuminated by light sources (not shown) such as light-emitting diodes through a light guide or the like (not shown).

The second display region 22 of the first display unit 11 is disposed between the first display region 21 and the second display unit 12 in a right and left direction of the vehicle.

The display control unit 13 controls the display of the first display unit 11 and the second display unit 12.

The memory unit 14 stores data required for the display in the first display unit 11 and the second display unit 12. Such data includes, for example, a predetermined display (an initial design data, an initial scene data) and a dramatized display (a modified design data, a modified scene data) that are displayed in the first display unit 11.

The instrument for the vehicle 10 according to the present embodiment has the aforementioned configuration. In the following sections, the operation of the instrument for the vehicle 10, that is, the control operation of the display control unit 13 will be described.

In the status where the ignition switch is On, such as when the vehicle is traveling, the display control unit 13 causes the first display region 21 to display a predetermined display (a first initial design, a first initial scene), causes the second display region 22 to indicate a predetermined indication (a second initial design, a second initial scene), and causes the light sources 33a of the segment light source 33 to be lit with a configured brightness. The predetermined indication on the second display unit 12 may be an indication according to the speed of the vehicle. As an example of the predetermined indication, the display control unit 13 may cause the indicator needle 42 to point at a particular position on the scale 43a that corresponds to the speed of the vehicle.

Figure 5:
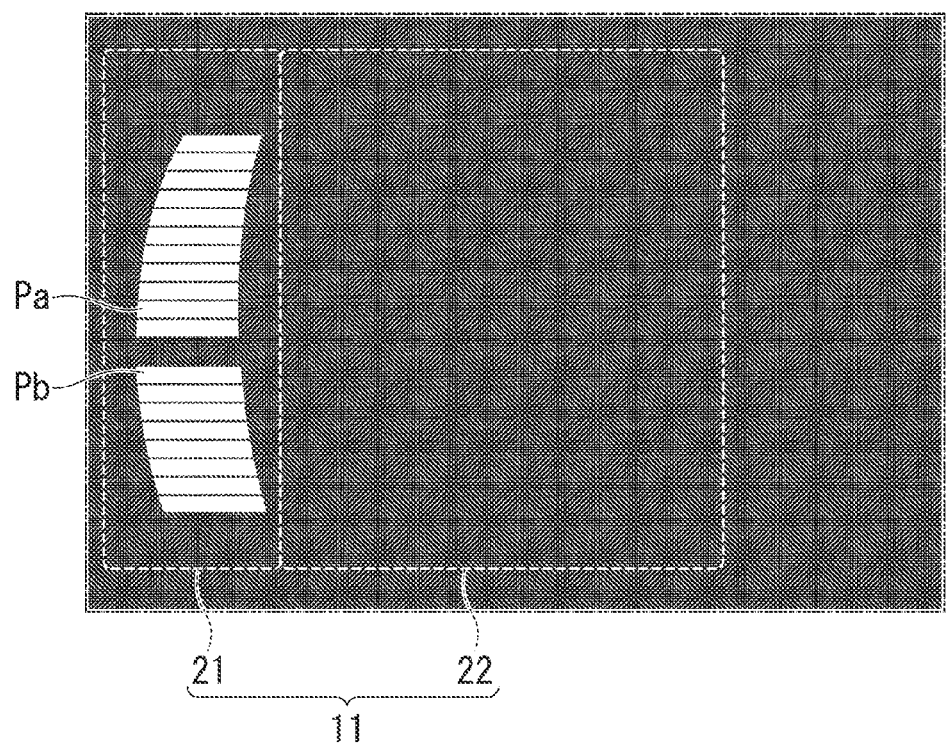
FIG. 5 is a diagram showing a display example of a first display region and a second display region on an dramatization operation of an instrument for a vehicle according to an embodiment of the present invention.

As shown in FIGS. 2 and 5, the predetermined display of the first display region 21 is multiple-segment bar meters Pa, Pb, that include segments, which indicate the degree of power running and regeneration of the traction motor (not shown in the drawings) of the vehicle. The segments of the bar meters are aligned in parallel with the outline of the second display unit 12. Each of the two bar meters represents power running and regeneration. In each of the bar meters, a particular number, between predetermined maximum and minimum numbers, of the segments are displayed in a region that has a shape that is parallel with the outline of the second display unit 12.

For example, the number of the segments displayed in the power running bar meter Pa increases from the minimum to the maximum as the degree of power running increases. The number of the segments displayed in the regeneration bar meter Pb increases from the minimum to the maximum as the degree of regeneration increases.

When starting up the vehicle where the ignition is switched from OFF to ON, or when shutting down the vehicle where the ignition is switched from ON to OFF, or in other occasions, the display control unit 13 generates the dramatized-display instruction signal and performs a dramatization operation according to the input of the dramatized-display instruction signal. As the dramatization operation, the display control unit 13 causes a dramatized display (a first modified design, a first modified scene) that is different from the predetermined display displayed in the first display region 21, causes the second display region 22 to turn dark (blank), and causes the plurality of light sources 33a to be lit with a predetermined brightness when the configured brightness of the segment light source 33 is greater than the predetermined brightness. Even in the situation where the background (backlight leakage) becomes unintentionally visible through the second display region 22 while the second display region 22 is turned dark (blank) (as a second modified design, or a second modified scene), the predetermined brightness is configured to be at a dim brightness so that this backlight leakage is not excessively outstanding, and does not disturb the visibility of the first display region 21 in which the dramatized display is displayed. In addition, if the configured brightness of the segment light source 33 is smaller than the predetermined brightness, the display control unit 13 causes the plurality of light sources 33a to be lit with the configured brightness.

Further, the display control unit 13 causes the second display unit 12 to perform a dramatized indication that is different from the predetermined indication.

The display control unit 13 causes the first display region 21 to perform the dramatized display. In an example of this dramatized display, the plurality of segment images (i.e. the plurality of segment images Pa, Pb of the multiple-segment bar meters for the power running and the regeneration) are displayed in a manner where the indications of the bar meters make a sweeping transition from the minimum value to the maximum value, and then sweep in backward from the maximum to the minimum value (along the outer line of the second display unit 12, as an indicator having a shape similar to the outer shape of the second display unit 12). This reciprocally sweeping transition display may be repeated. In this sweep display, the multiple-segment bars appear to show a movement parallel to the outer shape (outline) of the second display unit 12.

Further, the display control unit 13 causes the second display unit 12 to perform a dramatized indication. In an example of this dramatized indication, the indicator needle 42 makes a reciprocal sweeping transition between the minimum value Ma and the maximum value Mb of the scale 43a. This reciprocal sweeping transition may be repeated.

In addition, the display control unit 13 may synchronize the dramatized display on the first display region 21 and the dramatized indication on the second display unit 12. In other words, when the plurality of segment images Pa, Pb for the power running and the regeneration on the first display region 21 display the minimum indication, the display control unit 13 causes the indicator needle 42 to indicate at the minimum value of the scale 43a on the second display unit 12. Likewise, when the plurality of segment images Pa, Pb for the power running and the regeneration on the first display region 21 display the maximum indication, the display control unit 13 causes the indicator needle 42 to indicate the maximum value of the scale 43a on the second display unit 12.

In other words, in response to the input of the dramatized-display instruction signal, the control unit 13 causes the second display unit 12 to perform a sweeping display, in which the indicator needle 42 repeats reciprocating movements between minimum and maximum values of the scale 43a; the first display region 21 is capable of displaying a plurality of segment images Pa, Pb that are aligned in parallel with the outline of the second display unit 12, and capable of indicating minimum and maximum values by displaying one or more members of the plurality of segment images Pa, Pb; and in the dramatized display, the first display region 21 repeats reciprocally indicating between minimum and maximum values; and the sweeping display in the second display unit 12 and the dramatized display in the first display region 21 are synchronized.

(Dramatization Operation at Starting of the Vehicle)

Hereinbelow, an example of changes made in the dramatization operation at starting of the vehicle is described, including the value on the scale 43a indicated by the indicator needle 42 (the needle indication value), the brightness of the indicator needle 42 (the indicator needle brightness), the number of displayed segments in each of the multiple-segment images Pa, Pb for the power running and the regeneration on the first display region 21 (the segment image of the first display region), and the brightness of the segment light source 33 of the first display unit 11 (the first display unit brightness).

Figure 6:
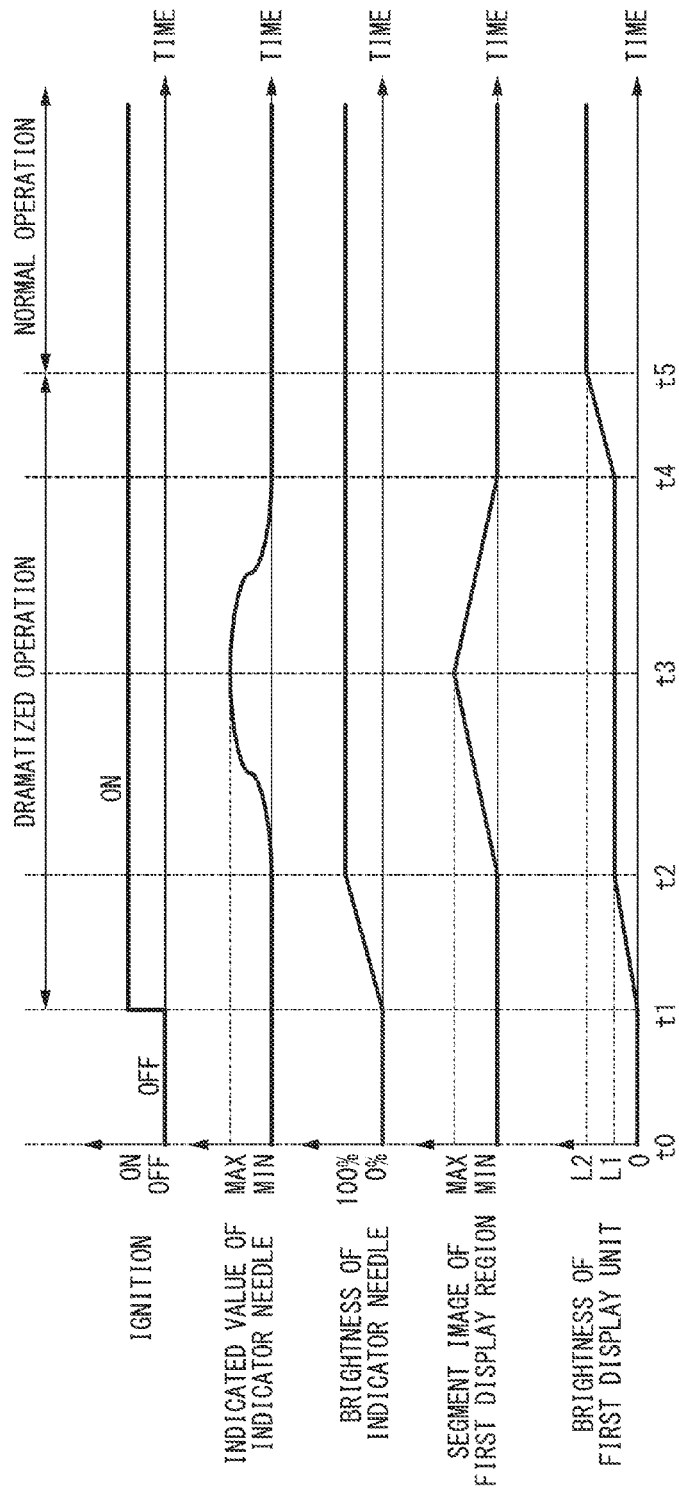
FIG. 6 is a diagram showing the status of the instrument for a vehicle according to the embodiment of the present invention while the vehicle is starting up. The diagram shows changes in the reading of the indicator needle, brightness of the indicator needle, a segment display of the first display region, and the brightness of the first display unit.

First, in the state where the ignition is OFF before time t1 shown in FIG. 6, the display control unit 13 displays the minimum value (MIN, for example zero) as the indicated value of the indicator needle, zero as the brightness of the indicator needle, the minimum value (MIN, for example zero) as the segment image of the first display region, and zero as the brightness of the first display unit.

Next, when the ignition is switched from OFF to ON at time t1, the display control unit 13 starts the dramatization operation, in which the brightness of the indicator needle increases gradually from zero toward 100 percent. Further, the second display region 22 is caused to turn dark (blank), while the brightness of the first display unit is gradually increased from zero toward the predetermined brightness L1.

Next, at time t2, the brightness of the indicator needle reaches 100 percent, and the brightness of the first display unit reaches the predetermined brightness L1. At this timing, the display control unit 13 gradually increases the indicated value of the indicator needle from the minimum value toward the maximum value (MAX), and gradually increases the number of segments displayed in the multiple-segment image of the first display region from the minimum number toward the maximum number (MAX).

Next, at time t3, the indicated value of the indicator needle and the multi-segment meters of the first display region reach the respective maximum values. At this timing, the display control unit 13 gradually decreases the indicated value of the indicator needle from the maximum value toward the minimum value, and also gradually decreases the segment image of the first display region from the maximum number toward the minimum number.

Next, at time t4, the indicated value of the indicator needle and the multi-segment meters of the first display region reach the respective minimum values. At this timing, the display control unit 13 gradually increases the brightness of the first display unit from the predetermined brightness L1 toward the configured brightness L2.

Next, at time t5, the brightness of the first display unit reaches the configured brightness L2. At this timing, the display control unit 13 stops the dramatization operation and starts the normal operation. In addition, as described above, the normal operation is performed while the ignition is kept ON, such as at driving the vehicle. In other words, the display control unit 13 causes the predetermined display to be displayed on the first display region 21, causes the predetermined indication to be indicated in the second display region 22, and causes the plurality of light sources 33a of the segment light source 33 to be lit with the configured brightness. Further, as the predetermined indication, the second display unit 12 performs an indication according to the speed of the vehicle. For example, the indicator needle 42 indicates a position on the scale corresponding to the speed of the vehicle.

(Dramatization Operation at Shutting-Down the Vehicle)

Hereinbelow, an example of changes made in the dramatization operation at shutting-down the vehicle will be described, including the value on the scale 43a indicated by the indicator needle 42 (the needle indication value), the brightness of the indicator needle 42 (the indicator needle brightness), the number of displayed segments in each of the multiple-segment images Pa, Pb for the power running and the regeneration on the first display region 21 (the segment image of the first display region), and the brightness of the segment light source 33 of the first display unit 11 (the first display unit brightness).

Figure 7:
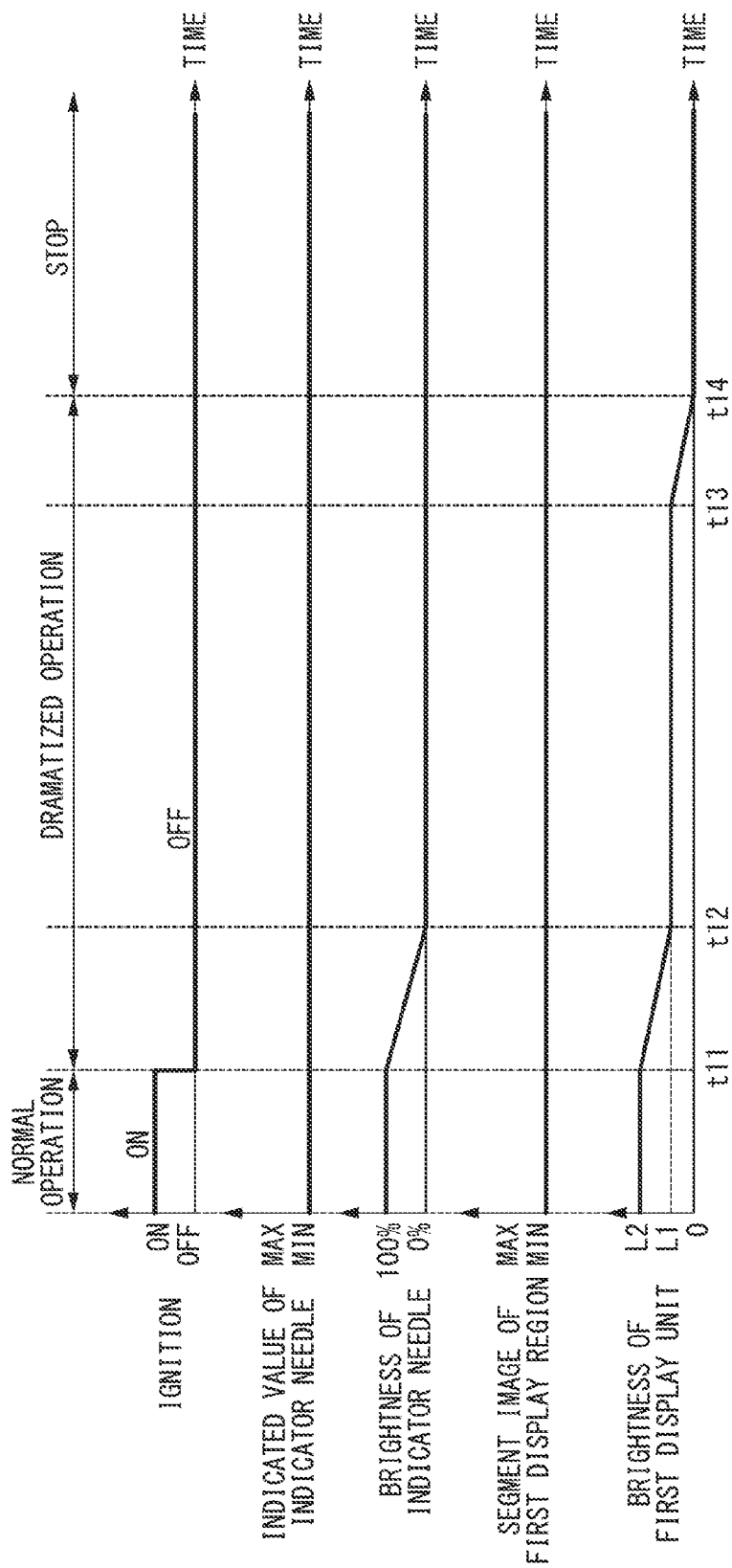
FIG. 7 is a diagram showing the status of the instrument for a vehicle according to the embodiment of the present invention while the vehicle is shutting down. The diagram shows changes in the reading of the indicator needle, the brightness of the indicator needle, the segment display of the first display region, and the first display unit brightness.

First, in the state where the ignition is ON before time t11 shown in FIG. 7, the display control unit 13 performs the normal operation, displays the indicated value of the indicator needle as the value according to the speed of the vehicle, lights up the brightness of the indicator needle as 100 percent, displays the segment image of the first display region as the display number according to the power running and the degree of regeneration of the traction motor, and lights up the brightness of the first display unit as the configured brightness L2.

Next, when the ignition is switched from ON to OFF at time t11, the display control unit 13 stops the normal operation, and starts the dramatization operation, in which the brightness of the indicator needle is gradually decreased from 100 percent toward zero. Further, the information on the second display region 22 is caused to turn dark (blank), except for predetermined information (for example, shift position, etc.), while the brightness of the first display unit is gradually decreased from the configured brightness L2 toward the predetermined brightness L1.

Next, at time t12, the brightness of the indicator needle reaches zero, and the brightness of the first display unit reaches the predetermined brightness L1. At this timing and thereafter, the display control unit 13 continues the display of the predetermined information (for example, shift position, etc.) on the second display region 22. Then, after a predetermined time has elapsed, at time t13, the display control unit 13 gradually decreases the brightness of the first display unit from the predetermined brightness L1 toward zero.

Next, at time t14 where the brightness of the first display unit reaches zero, the display control unit 13 stops the dramatization operation, and shifts to a stop state.

As described above, in the instrument for the vehicle 10 according to the present embodiment, when the instrument performs the dramatization operation in response to the input of the dramatized-display instruction signal, the instrument prevents an excessive difference of the brightness between the first display region 21 displaying the dramatized display and the second display region 22 caused to turn dark (blank). This is achieved by causing the segment light source 33 to be lit at the predetermined brightness, which is lower than the configured brightness. Thus, even in an environment where the backlight leaks through the turned-dark (turned-blank) second display region 22, the backlight leak is not apparent.

When the configured brightness of the segment light source 33 is lower than the predetermined brightness, even when a plurality of light sources 33a is lit at the configured brightness, the backlight leaks through the turned-dark (turned-blank) second display region 22 is not apparent.

Further, since the turned-dark (turned-blank) second display region 22 is placed in between the first display region 21 and the second display unit 12, the dramatized display and the dramatized indication provides a clearly notable impression.

Further, since the first display region 21, the second display region 22, and the second display unit 12 are arranged in a right and left direction of the vehicle, the dramatization operation is presented over the wide range in a right and left direction of the vehicle.

Further, in the dramatized display on the first display region 21, the multiple-segment images (i.e. the plurality of segment images Pa, Pb for the power running and the regeneration) are aligned in parallel with the outline of the second display unit 12. Thus, the dramatized display on the first display region 21 and the dramatized indication on the second display unit 12 provides a uniformed impression.

The embodiments described above are presented as examples and are not intended to limit the scope of the invention. The novel embodiments described above may be implemented in various other forms. Omissions, substitutions and changes from the embodiments may be made without departing from the scope of the invention. The embodiments described above and the modifications are included in the scope and the summary of the invention, and are included in the invention described in the claims and the range of equivalents thereof.

As described above, the instrument for the vehicle 10 according to the present embodiment includes: a display unit 11 that is transmissive type and has at least a first display region 21 and a second display region 22; a light source 33a that is configured to illuminate the display unit 11 from behind of the display unit 11; and a control unit 13 that causes a predetermined display to be displayed in the first display region 21, causes a predetermined display to be displayed in the second display region 22, and causes the light source 33a to be lit with a configured brightness, wherein in response to an input of an dramatized-display instruction signal, the control unit 13 causes an dramatized display that is different from the predetermined display to be displayed in the first display region 21, causes the second display region 22 to turn dark (blank), and causes the light source 33a to be lit with a predetermined brightness when the configured brightness is greater than the predetermined brightness. In addition, when the configured brightness is smaller than the predetermined brightness, the control unit 13 causes the light source 33a to be lit with the configured brightness in response to the input of the dramatized-display instruction signal. In addition, the instrument for the vehicle 10 further includes a second display unit 12 that is located near the display unit 11 and performs a predetermined indication according to a control from the control unit 13, wherein: the second display region 22 is located between the first display region 21 and the second display unit 12; and in response to the input of the dramatized-display instruction signal, the control unit 13 causes the second display unit 12 to perform an dramatized indication that is different from the predetermined indication. In addition, the first display region 21 and the second display region 22 are arranged in a right and left direction of the vehicle. In addition, the second display unit 12 includes a scale 43a and an indicator needle 42 that indicates a reading on the scale 43a; in response to the input of the dramatized-display instruction signal, the control unit 13 causes the second display unit 12 to perform a sweeping display, in which the indicator needle 42 repeats reciprocating movements between minimum and maximum values of the scale 43a; the first display region 21 is capable of displaying plurality of segments that are aligned in parallel with the outline of the second display unit 12, and capable of indicating minimum and maximum values by displaying one or more members of the plurality of segments; and in the dramatized display, the first display region 21 repeats reciprocally indicating between minimum and maximum values; and the sweeping display in the second display unit 12 and the dramatized display in the first display region 21 are synchronized.

What is claimed is:

1. An instrument for a vehicle comprising:
   a liquid crystal display unit that is transmissive type and comprises a first display region and a second display region that are adjacent to each other;
   a light source that is configured to illuminate the first display region and the second display region from behind the liquid crystal display unit; and
   a control unit that causes a first predetermined display to be displayed in the first display region, causes a second predetermined display to be displayed in the second display region, and causes the light source to be lit with a configured brightness, wherein
   in response to an input of a dramatized-display instruction signal, the control unit causes a dramatized display that is different from the first predetermined display to be displayed in the first display region, causes the second display region to turn blank by removing the second predetermined display, and causes the light source to be lit with a predetermined brightness when the configured brightness is greater than the predetermined brightness.

2. The instrument for the vehicle according to claim 1, wherein when the configured brightness is smaller than the predetermined brightness, the control unit causes the light source to be lit with the configured brightness in response to the input of the dramatized-display instruction signal.

3. The instrument for the vehicle according to claim 2, further comprising a second display unit that is located near the liquid crystal display unit and performs a predetermined indication according to a control from the control unit, wherein:
   the second display region is located between the first display region and the second display unit; and
   in response to the input of the dramatized-display instruction signal, the control unit causes the second display unit to perform a dramatized indication that is different from the predetermined indication.

4. The instrument for the vehicle according to claim 3, wherein
   the first display region and the second display region are arranged in a right and left direction of the vehicle.

5. The instrument for the vehicle according to claim 3, wherein:
   the second display unit comprises a scale and an indicator needle that indicates a reading on the scale;
   in response to the input of the dramatized-display instruction signal, the control unit causes the second display unit to perform a sweeping indication, in which the indicator needle repeats reciprocating movements between minimum and maximum values of the scale, as the dramatized indication;
   the first display region is capable of displaying plurality of segments that are aligned in parallel with the outline of the second display unit, and capable of indicating minimum and maximum values by displaying one or more members of the plurality of segments; and
   in the dramatized display, the first display region repeats reciprocally indicating between minimum and maximum values; and
   the sweeping indication in the second display unit and the dramatized display in the first display region are synchronized.

6. The instrument for the vehicle according to claim 2, wherein
   the first display region and the second display region are arranged in a right and left direction of the vehicle.

7. The instrument for the vehicle according to claim 1, further comprising a second display unit that is located near the liquid crystal display unit and performs a predetermined indication according to a control from the control unit, wherein:
   the second display region is located between the first display region and the second display unit; and
   in response to the input of the dramatized-display instruction signal, the control unit causes the second display unit to perform a dramatized indication that is different from the predetermined indication.

8. The instrument for the vehicle according to claim 7, wherein
   the first display region and the second display region are arranged in a right and left direction of the vehicle.

9. The instrument for the vehicle according to claim 7, wherein:
   the second display unit comprises a scale and an indicator needle that indicates a reading on the scale;
   in response to the input of the dramatized-display instruction signal, the control unit causes the second display unit to perform a sweeping indication, in which the indicator needle repeats reciprocating movements between minimum and maximum values of the scale, as the dramatized indication;
   the first display region is capable of displaying plurality of segments that are aligned in parallel with the outline of the second display unit, and capable of indicating minimum and maximum values by displaying one or more members of the plurality of segments; and
   in the dramatized display, the first display region repeats reciprocally indicating between minimum and maximum values; and
   the sweeping indication in the second display unit and the dramatized display in the first display region are synchronized.

10. The instrument for the vehicle according to claim 1, wherein
    the first display region and the second display region are arranged in a right and left direction of the vehicle.

* * * * *